Dec. 14, 1965   Y. C. EDENBOROUGH   3,223,002
AIR CYLINDERS AND MANUFACTURE THEREOF
Filed July 30, 1963
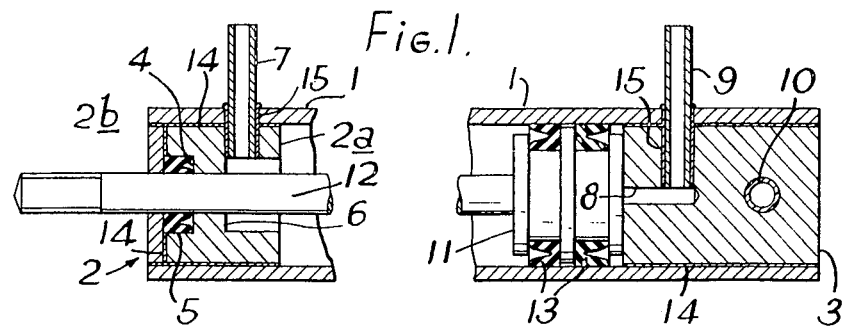
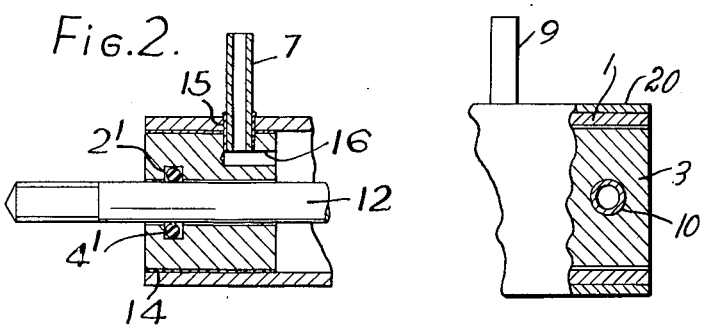
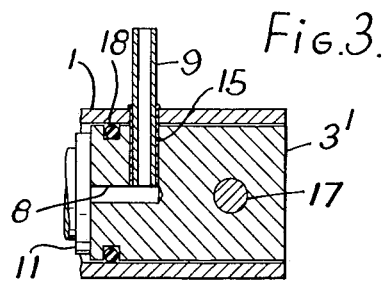
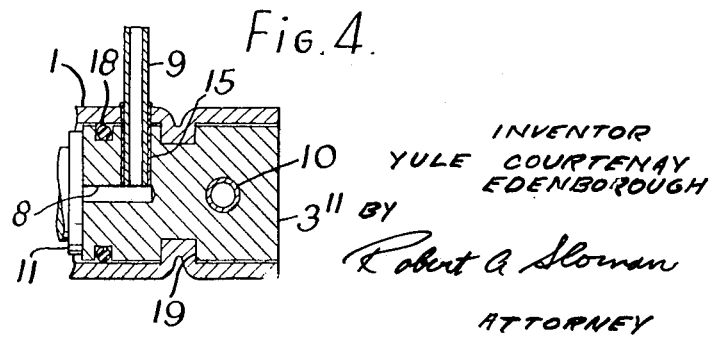
INVENTOR
YULE COURTENAY
EDENBOROUGH
BY
Robert A. Sloman
ATTORNEY

3,223,002
AIR CYLINDERS AND MANUFACTURE THEREOF
Yule Courtenay Edenborough, 55 Tring Road, Dunstable, England
Filed July 30, 1963, Ser. No. 298,725
Claims priority, application Great Britain, Oct. 10, 1962, 38,378/62
8 Claims. (Cl. 92—169)

This invention relates to air cylinders, i.e. cylinders for pneumatically operable piston-and-cylinder devices, and to methods of manufacturing same.

Heretofore, air cylinders have been manufactured from metal in order to be rigid under various conditions of pressure and temperature and in order securely to attach the end pieces to the tube, three main methods have been employed, namely providing complementary screw threads on the end pieces and the tube, clamping the end pieces to the tube by means of long studs, and providing interengaging flanges which are bolted together.

Such air cylinders are costly to manufacture and it is the object of the present invention to provide an air cylinder which is simple and inexpensive to produce but wherein, at the same time, the end pieces are securely and sealingly attached to the tube.

Accordingly, one aspect of the present invention provides a cylinder for a pneumatically-operable piston-and-cylinder device, the cylinder comprising a tube and a plug securely and sealingly closing an end of the tube, the tube and the plug each being formed of a rigid synthetic resin.

Another aspect of the present invention provides a method of manufacturing a cylinder for a pneumatically-operable piston-and-cylinder device, comprising a tube and a plug of a rigid synthetic resin and securely and sealingly closing an end of the tube with the plug.

The plug may be united with the tube, for example by solvent welding or filler rod welding and thereby securely and sealingly close an end of the tube. Alternatively, the plug may be mechanically secured to the tube and sealing means provided between the plug and the tube. For this purpose the mechanical connection may be by spin welding or by moulded screw threads.

In order that the invention may be more clearly understood reference is directed to the following description and the accompanying drawings, in which:

FIG. 1 is a fragmentary sectional view of a pneumatically-operable piston-and-cylinder device including a cylinder according to one embodiment of the invention;

FIG. 2 is a fragmentary sectional view of one end of such a device including a modified cylinder;

FIG. 3 is a fragmentary sectional view of the other end of such a device including another modified cylinder; and FIG. 4 is a view similar to FIG. 3 including a further modified cylinder;

FIG. 5 is a fragmentary view of the cylinder of FIG. 1, with the addition of a fibre glass sleeve.

In the drawing like reference numerals identifying like parts, so as to avoid unnecessarily repetitive description.

In FIG. 1 a pneumatically-operable piston-and-cylinder device includes a cylinder composed of a tube 1 and end plugs 2 and 3, the plug 2 being formed of two parts 2a and 2b. The parts 2a and 2b have aligned central bores and the part 2a has at one end an annular shoulder 4 surrounding the bore so that the assembly of the parts provides an annular inwardly-opening recess for a U-ring 5. The part 2a also has an annular shoulder 6 at its other end surrounding the bore to provide communication between the interior of the cylinder and a conduit 7 inserted through a wall of the tube and into the part 2a.

The plug 3 has a central blind bore 8 to provide communication between the interior of the cylinder and a conduit 9 inserted through the wall of the tube and into the plug 3. A trunnion 10 is also inserted through the walls of the tube and the plug 3.

The device also includes a double acting piston 11 to which a piston rod 12 is attached, the piston rod extending through the bores in the parts of the plug 2. The piston has two annular outwardly-opening grooves each receiving a U-ring 13.

The tube 1 is of rigid unplasticised polyvinyl chloride while the plugs 2 and 3 are of rigid unplasticised or plasticised polyvinyl chloride either machined from a bar or injection moulded and the tube and each plug and the two parts of the plug 2 are respectively bonded together as at 14 by an epoxy resin such as that available under the registered Trademark Araldite. The same adhesive is also used at 15 to bond the conduits 7 and 9 to the cylinder.

The piston rod may, for example, be of stainless steel, the piston of an aluminium alloy, the conduits 7 and 9 of copper, and the trunnion 10 of brass or copper.

In FIG. 2 is shown a modification of the plug 2 in FIG. 1. The modified plug 2′ is in one piece and a recess for a piston rod seal, here shown as an O-ring 4′, is formed in the one piece plug. Communication between the interior of the cylinder and the conduit 7 is via an off-centre blind bore 16 in the plug.

In FIGS. 1 and 2 the reference numeral 14 may alternatively indicate other methods of uniting the tube and the plugs. For example, the tube and the plugs may be solvent welded together with a suitable solvent, such as the filler adhesive for rigid polyvinyl chloride available under the trade designation Chemidus. As a further alternative, the tube and the plugs may be thermally welded together using a hot air gun and a polyvinyl chloride filler. Whatever means of uniting the tube and the plugs is used, whether bonding, solvent welding or thermal welding, such means not only secures the plugs to the tube but also provides a seal between each plug and the tube.

In FIG. 3 is shown a modification of the plug 3 in FIG. 1, the modified plug 3′ being a push fit within the tube and being mechanically secured by a pin 17. Sealing is effected by means of an O-ring 18 in an outwardly-opening annular groove in the plug 3′.

FIG. 4 shows a further modification of the plug 3 in FIG. 1. Sealing is effected in the same way as in FIG. 3 but the further modified plug 3″ is provided with a second outwardly-opening annular groove 19 into which the tube 1 is thermally swaged mechanically to secure the plug in the tube.

The cylinders thus far described are suitable for use at a temperature of 50° C. and subject an internal pressure of 110 p.s.i. At higher temperatures the polyvinyl chloride tends to lose some of its rigidity and in order to render the cylinders suitable for use at a temperature of 90° C. and subject to the same internal pressure of 110 p.s.i. the tube is encased in a sleeve 20, FIG. 5, formed of glass fibres bonded together and to the tube throughout its length by means of an adhesive, for example consisting of two components both available under the Registered Trademark Araldite and respectively having the trade designations MY 753 and Hardener RY 951 or 956 in the proportions of ten parts to one. The glass fibres may be in the form of woven sheet or, alternatively the glass fibres may be in the form of an unwoven mat in which the fibres lie in substantially the same direction, which direction is helical about the tube.

As an alternative to making the tube of polyvinyl chloride it may instead be made of a rigid synthetic resin available under the Trademark Makrolon which is the polycarbonic ester of 4,4'-dihydroxydiphenyl-2,2-propane having the structural formula:

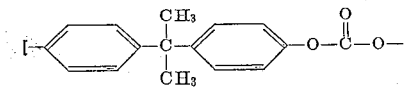

The same resin can be used for the plugs or these can be made of unplasticised or plasticised polyvinyl chloride, the plugs being united with the tube as appropriate to the materials used in the manner shown in FIG. 1 or 2, or mechanically secured to the tube in the manner shown in FIG. 3 or FIG. 4 of the accompanying drawing.

The synthetic resin available under the Trademark Makrolon retains its rigidity at elevated temperature and in particular is suitable for use at both temperature conditions and the pressure conditions specified above.

The plugs may be in the form of a spigot of a flanged end piece and where the end pieces are united with the tube the shoulder on the flange abutting the end of the tube may also be united with the tube.

Although certain synthetic resins have been quoted as being suitable for the manufacture of the tube and plug it will be appreciated that these quoted resins are by way of example only and that it is within the scope of this invention for any suitable synthetic resins to be used, among which are all grades of acrylonitrite butadiene, styrene; high density polyethylene; polyamide; polypropylene, and acetal; the latter being known under the tradename Delrin.

I claim:

1. A cylinder for a pneumatically-operated piston and cylinder device, the cylinder comprising an axial wall and end walls, one end wall having a bore to receive a piston rod therethrough, and a sleeve consisting of glass fibres bonded to each other and the axial wall of the cylinder; the cylinder being formed of a rigid synthetic plastic.

2. A cylinder according to claim 1 wherein the glass fibers are in a woven sheet.

3. A cylinder according to claim 1 wherein the glass fibres are in the form of an unwoven mat in which the fibres lie in substantially the same direction helically about the axial wall of the cylinder.

4. In a pneumatically operated cylinder and piston device, an improved cylinder assembly comprising:
   an axially elongated tubular member having a substantially continuous side wall which circumscribes a central bore adapted to receive said piston;
   said tubular member having opposed open ends;
   end plug means disposed at each of said open ends and projecting at least partially into said central bore;
   air inlet means extending at least partially through one of said end plug means and communicating with said central bore to permit introduction of a supply of pressurized air to move said piston;
   air outlet means extending at least partially through the other of said end plug means and communicating with said central bore to permit exhaustion of air therefrom as said piston moves therein;
   said tubular member and said end plug means being fabricated of a rigid synthetic resinous material; and
   attachment means for securing said end plug means within said tubular member;
   said attachment means being at least a partial fusion between the material of said end plug means and the material of said tubular member.

5. An improved cylinder assembly as defined in claim 4 wherein said synthetic resinous material is polyvinyl chloride.

6. An improved cylinder assembly as defined in claim 4 wherein said synthetic resinous material is selected from the group consisting of polyvinyl chlorides, acrylonitrile-butadiene styrene copolymers, acetal-type resins and polyolefins of the group consisting of high density polyethylene and polypropylene; polyamides and the carbonic ester of 4,4'-dihydroxydiphenyl-2,2-propane of the structural formula:

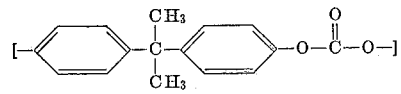

7. In a pneumatically operated cylinder and piston device, an improved cylinder assembly comprising:
   an axially elongated tubular member having a substantially continuous side wall which circumscribes a central bore adapted to receive said piston;
   said tubular member having opposed open ends;
   end plug means disposed at each of said open ends and projecting at least partially into said central bore;
   air inlet means extending at least partially through one of said end plug means and communicating with said central bore to permit introduction of a supply of pressurized air to move said piston;
   air outlet means extending at least partially through the other of said end plug means and communicating with said central bore to permit exhaustion of air therefrom as said piston moves therein;
   said tubular member and said end plug means being fabricated of a rigid synthetic resinous material; and
   attachment means for securing said end plug means within said tubular member;
   said attachment means being a retaining pin extending through said end plug means and being mounted in said tubular member side wall.

8. In a pneumatically operated cylinder and piston device, an improved cylinder assembly comprising:
   an axially elongated tubular member having a substantially continuous side wall which circumscribes a central bore adapted to receive said piston;
   said tubular member having opposed open ends;
   end plug means disposed at each of said open ends and projecting at least partially into said central bore;
   air inlet means extending at least partially through one of said end plug means and communicating with said central bore to permit introduction of a supply of pressurized air to move said piston;
   air outlet means extending at least partially through the other of said end plug means and communicating with said central bore to permit exhaustion of air therefrom as said piston moves therein;
   said tubular member and said end plug means being fabricated of a rigid synthetic resinous material; and
   attachment means for securing said end plug means within said tubular member;
   said attachment means being formed by swaging at least a portion of said tubular member side wall inwardly to mechanically clench against said end plug means.

References Cited by the Examiner

UNITED STATES PATENTS

| | | | |
|---|---|---|---|
| 2,498,831 | 2/1950 | Veitch | 156—307 |
| 2,549,818 | 4/1951 | Joy | 92—168 X |
| 2,870,791 | 1/1959 | Wells | 92—163 X |
| 2,890,917 | 6/1959 | Prince | 92—164 X |
| 2,963,394 | 12/1960 | Wilkinson | 156—306 |
| 2,987,046 | 6/1961 | Atherton | 92—163 |
| 3,143,933 | 8/1964 | Norton | 92—85 |

KARL J. ALBRECHT, *Primary Examiner.*

RICHARD B. WILKINSON, *Examiner.*